(12) United States Patent
Lee

(10) Patent No.: US 8,797,572 B2
(45) Date of Patent: Aug. 5, 2014

(54) NETWORK SCAN APPARATUS TO CONFIRM SCANNING OPERATION AND METHOD OF USING THEREOF

(75) Inventor: Dong-hoon Lee, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 645 days.

(21) Appl. No.: 12/123,736

(22) Filed: May 20, 2008

(65) Prior Publication Data

US 2008/0316528 A1    Dec. 25, 2008

(30) Foreign Application Priority Data

Jun. 25, 2007    (KR) ........................ 10-2007-0062038

(51) Int. Cl.
*G06F 3/12* (2006.01)
*H04N 1/00* (2006.01)

(52) U.S. Cl.
USPC ......................................... 358/1.15; 358/403

(58) Field of Classification Search
None
See application file for complete search history.

(56) References Cited

U.S. PATENT DOCUMENTS

| | | | | |
|---|---|---|---|---|
| 4,987,447 A | * | 1/1991 | Ojha | 399/84 |
| 5,196,943 A | * | 3/1993 | Hersee et al. | 358/403 |
| 2002/0198954 A1 | * | 12/2002 | Okamoto et al. | 709/213 |
| 2005/0198558 A1 | * | 9/2005 | Chrisop et al. | 715/500 |
| 2007/0058195 A1 | * | 3/2007 | Nakamura et al. | 358/1.15 |
| 2007/0121836 A1 | * | 5/2007 | Alcott et al. | 379/111 |
| 2008/0007755 A1 | * | 1/2008 | Murakami et al. | 358/1.13 |
| 2008/0007791 A1 | * | 1/2008 | Nagarajan et al. | 358/402 |
| 2008/0137129 A1 | * | 6/2008 | Ferlitsch | 358/1.15 |
| 2010/0149587 A1 | * | 6/2010 | Yoshida | 358/1.15 |

FOREIGN PATENT DOCUMENTS

| KR | 2005-8361 | 1/2005 |
|---|---|---|
| KR | 10-2006-0105371 | 10/2006 |

OTHER PUBLICATIONS

Korean Office Action issued Aug. 30, 2013 in corresponding Korean Patent Application No. 10-2007-0062038.
Korean Office Action issued Feb. 17, 2014 in Korean Patent Application No. 10-2007-0062038.

* cited by examiner

*Primary Examiner* — Vincent Rudolph
(74) *Attorney, Agent, or Firm* — Staas & Halsey LLP

(57) ABSTRACT

A network scan apparatus includes: a scanner including a scanning unit to scan a document and generate an image file based on the scanned document, a transmitting unit to transmit the image file, and an output selection unit to select whether to output scan file information; an output device, connected to the scanner, via a network, to output the scan file information according to whether the scan file information is selected to be output after a scanning operation; and a host computer connected to the scanner and the output device via the network, to collect the scan file information transmitted from the scanner, and transmit the scan file information to the output device.

23 Claims, 5 Drawing Sheets

FIG. 2

<SCANNED IMAGE FILE INFORMATION>

NUMBER OF SCANNED DOCUMENT PAGE : TOTAL 3
FILE NAME OF SCANNED IMAGE : Scan_030201.jpg
　　　　　　　　　　　　　　　　Scan_030202.jpg
　　　　　　　　　　　　　　　　Scan_030203.jpg
SIZE OF SCAN FILE : TOTAL 3M BYTES
LOCATION FOR SCAN COPY :\\ DH-Computer\ My document\My picture
RESOLUTION OF SCAN IMAGE : 300DPI
LINKED PROGRAMS FOR EXECUTING SCAN FILE : Adobe Photoshop 9.0
NETWORK IP FOR SCAN TRANSMISSION : 10.88.193.55

............
............

NETWORK SCAN APPARATUS TO CONFIRM SCANNING OPERATION AND METHOD OF USING THEREOF

CROSS-REFERENCE TO RELATED APPLICATION

This application claims the benefit of Korean Application No. 2007-62038, filed Jun. 25, 2007 in the Korean Intellectual Property Office, the disclosure of which is incorporated herein by reference.

BACKGROUND OF THE INVENTION

1. Field of the Invention

Aspects of the present invention relate to a network scan apparatus to scan a document through a network and a method of using the same, and more particularly, to a network scan apparatus, which outputs information indicating whether scanned document has been successfully scanned through an output device, and a method of using the same.

2. Description of the Related Art

In general, a device which employs a scanner or a multifunction device having a scanning function shared through a network is called a network scan apparatus. A network scan apparatus is used to scan a document, i.e., a manuscript, to create an image file, and to transmit the scanned image file to a host computer connected to the network. In a conventional network scan apparatus, a document is put on the scanner (or the multifunction device) and a host computer is selected. Then, a scanned image file is transmitted to the selected host computer, thereby completing a typical scanning operation.

However, in this case, it is impossible to check a scanned result using the scanner. To check the scanned result, a user has to go to the object host computer after completing the scanning operation to check the scanned result. This conventional process of checking whether a scanned image file has been successfully transmitted is inconvenient for the user and takes a relatively long time to check the scanned result, especially when the host computer is located far away from the scanner (or the multifunction device).

SUMMARY OF THE INVENTION

Accordingly, it is an aspect of the present invention to provide a network scan apparatus which confirms whether a scanning operation is completed by displaying information indicating whether a scanned document has been successfully scanned through an output device included in a scanner or provided as a peripheral device to the scanner, and a method of using the same.

According to an aspect of the present invention, a network scan apparatus includes a scanner including a scanning unit to scan a document and generate an image file based on the scanned document, a transmitting unit to transmit the image file, and an output selection unit to select whether to output scan file information; an output device connected to the scanner, via a network, to output the scan file information according to whether the scan file information is selected to be output after a scanning operation; and a host computer connected to the scanner and the output device via the network, to collect the scan file information transmitted from the scanner and transmit the scan file information to the output device.

According to an aspect of the present invention, the collected scan file information includes at least one of a number of a scanned document pages, a file name of the image file, a size of the image file, a location of the image file, a resolution of the image file, a linked program to execute the image file, a name of an object host computer, an internet protocol of the network, a thumbnail of the image file, and a date and a time of the scanning operation.

According to an aspect of the present invention, the output device includes a printer to print the scan file information on a printing medium, and the scanner and the printer are a multifunction device.

According to an aspect of the present invention, the output device or the scanner further includes a display to display the scan file information.

According to an aspect of the present invention, the scanner further includes an option selection unit to select a scan option of the scanner.

According to another aspect of the present invention, a network scan method of scanning a document using a scanner, an output device to output information about the document, and an object computer connected to the scanner and the output device through a network, includes: scanning a document with the scanner, transmitting a scanned image file based on the scanned document to the object host computer, requesting scan file information indicating whether the scanned document has been successfully scanned to be output, transmitted the scan file information from the object host computer, and outputting the transmitted scan file information through the output device.

According to an aspect of the present invention, the transmitting of the scanned image file includes selecting the object host computer to which the scanned image file is transmitted from among a plurality of host computers connected to the network, and transmitting the scanned image file to the object host computer.

According to an aspect of the present invention, the outputting of the scan file information includes collecting the scan file information transmitted from the object host computer using the output device.

According to an aspect of the present invention, the collected scan file information includes at least one of a number of scanned document pages, a file name of the scanned image file, a size of the scanned image file, a location of the scanned image file, a resolution of the scanned image file, a linked program to execute the scanned image file, a name of the object host computer, an internet protocol of the network, a thumbnail of the scanned image file, and a date and a time of a scanning operation.

According to an aspect of the present invention, the output device includes a printer to print the scan file information on a printing medium, and the scanner and the printer are a multifunction device.

According to an aspect of the present invention, the output device or the scanner further includes a display to display the scan file information.

According to an aspect of the present invention, the network scan method further includes selecting a scan option of the scanner.

BRIEF DESCRIPTION OF THE DRAWINGS

These and/or other aspects and advantages of the invention will become apparent and more readily appreciated from the following description of the exemplary embodiments, taken in conjunction with the accompanying drawings of which:

FIG. 2 is an example of output information related to an image file scanned by the network scan apparatus of FIG. 1;

DETAILED DESCRIPTION OF THE EMBODIMENTS

Figure 1:
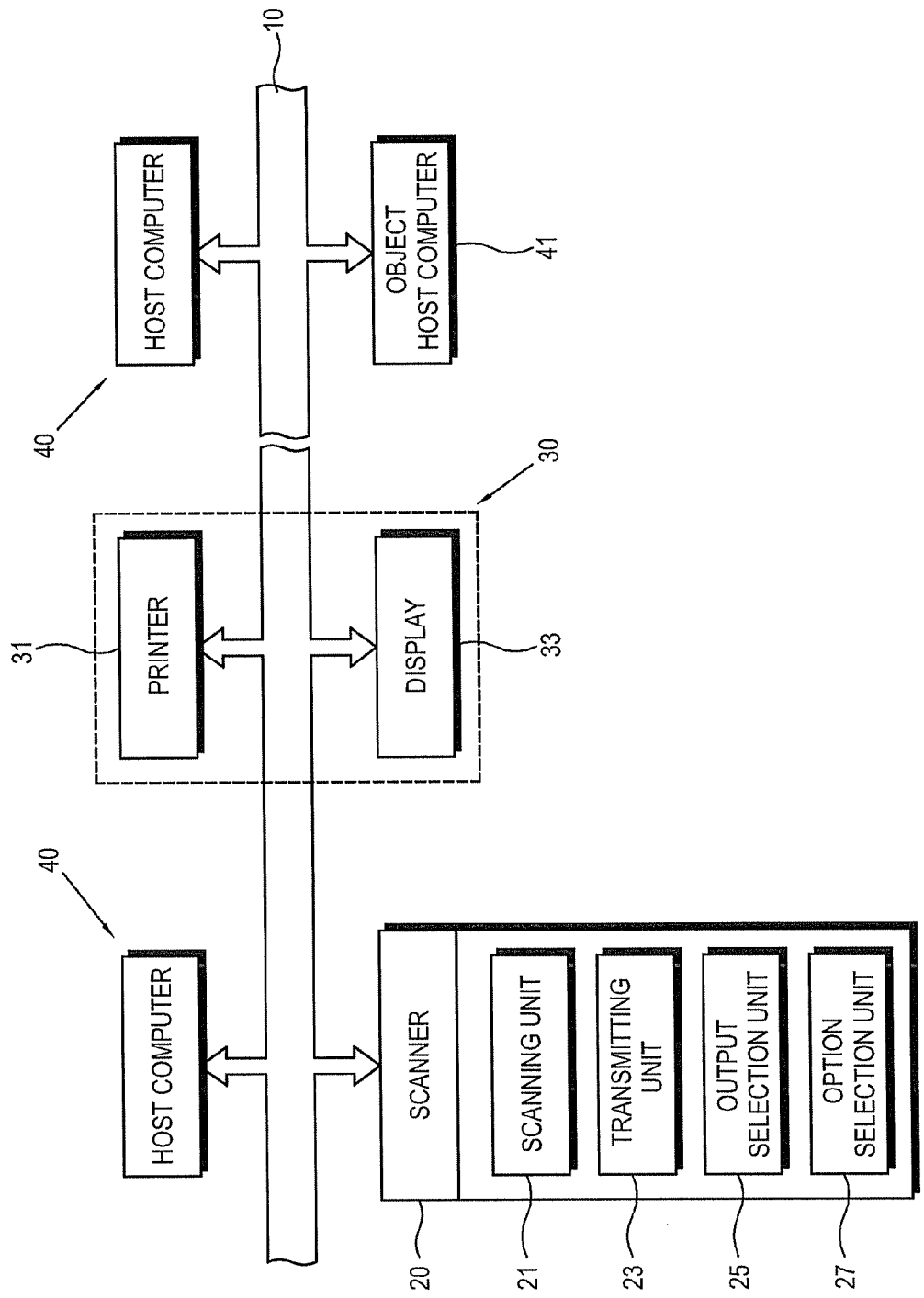
FIG. 1 is a schematic block diagram of a network scan apparatus according to an exemplary embodiment of the present invention.

These and/or other aspects and advantages of the invention will become apparent and more readily appreciated from the following description of the embodiments, taken in conjunction with the accompanying drawings of which:

Referring to FIG. 1, a network scan apparatus according to an exemplary embodiment of the present invention includes a scanner 20, an output device 30 and at least one host computer 40, which are interconnected through a network 10. The network 10 may be various types of networks and may be based on various types of connections, such as, for example, a LAN, the Internet, a wired network, a wireless network, a combination thereof, etc. The scanner 20 and the output device 30 are connected to the host computer 40 with a client program.

The scanner 20 includes a scanning unit 21 to scan a document, i.e, a manuscript, into an image file to be read, a transmitting unit 23 to transmit the read image file to the host computer 40, and an output selection unit 25 to select whether to output scan file information. The scanning unit 21 scans a document, such as a page of a book, a sheet of paper having text and/or images formed thereon, etc., positioned by a user, and reads a predetermined image file corresponding to the scanned document. Through the network 10, the transmitting unit 23 transmits the read image file to an object host computer 41 selected among the host computers 40. Here, the selection of the object host computer 41 is performed in an operation unit (not shown) provided in the scanner 20. However, the selection of the object host computer 41 may also be performed in operation units which are provided elsewhere, for example, in the object host computer 41. Also, it is understood that various components of the scanner 20 may be combined, such as, for example, the scanning unit 21 and the transmitting unit 23.

The scanner 20 may further include an option selection unit 27 allowing a scan option to be selected. The various types of scan options include, for example, at least one of a color option (color or black and white), a file format, such as .pdf, tiff, etc., and a scan size.

The output selection unit 25 is a scanner option user interface that allows a user to select whether to output information about the scanned image file, i.e., the scan file information generated when the document is scanned by the scanning unit 21. When a user selects the scan file information to be output through the output selection unit 25, the scanner 20 transmits a request to the client program installed in the object host computer 41 requesting scanning results of the document scanning operation.

According to aspects of the present invention, the scan file information includes at least one of a number of pages of a scanned document, a file name of the image file, a size of the image file, a location of the image file, e.g., a folder in which the image file is automatically stored, a resolution of the image file, a linked program to execute the image file, a name of an object host computer, an internet protocol of the network 10 used to transmit the image file from the scanner 20 to the object host computer 41, a thumbnail of the image file, a date and a time of a scanning operation, etc. At least one of these types of scan file information is selected to be output. It is understood that a combination of these types of scan file information may be output as well.

The object host computer 41 collects the scan file information based on image data transmitted from the scanner 20, and decodes and packets the collected scan file information, thereby transmitting the collected scan file information to the output device 30. For instance, when the scan file information is requested by a user, a scan program installed in the object host computer 41, which controls the scanner, creates the scan file information based on the completed scan image data transmitted through the transmitting unit 23. Then, the scan program converts the scan file information to be output through the output device 30, and transmits the scan file information to the output device 30 through the network 10.

The output device 30 outputs the scan file information when a scan file information output is selected through the output selection unit 25. According to an aspect of the present invention, the output device 30 includes at least one of a printer 31 having an output function which prints the scan file information received from the object host computer 41 on a printing medium, such as a sheet of paper, a transparency sheet, etc., and a display 33 having an output function which visually displays the scan file information. When a plurality of output devices 30 are connected to the network 10, a user selects one of the output devices 30 to output the scan file information by using a manipulating unit (not shown) of the scanner 20. It is understood that other output functions besides visual displays and printed media may be employed to output the scan file information according to other aspects of the present invention, for example, audio sounds, etc.

According to an aspect of the present invention, the output device 30 is disposed adjacent to the scanner 20. In this case, a user who scanned a document can quickly check whether the scanning operation has been completed by viewing scan file information which has been output, for example, by being printed on a printing medium or displayed on the display 33.

FIG. 2 is an example of output information related to an image file scanned by the network scan apparatus of FIG. 1. Referring to FIG. 2, the information related to the scanned image file output through the output device may be various types, including, for example, a number of scanned document pages, a file name of the image file, a size of the image file, a location of the image file, a resolution of the image file, a linked program to execute the image file, a name of an object host computer, and an internet protocol of the network 10 used to transmit the image file from the scanner 20 to the object host computer 41. Accordingly, a user can check whether the scanning operation is successfully performed on the basis of the output information related to the image file to confirm the scanning operation. It is understood that the information related to the scanned image file is not limited to the examples described above.

According to the network scan apparatus with the configuration shown in FIG. 1, the information related to the image data scanned by the scanner 20 and transmitted to the remote object host computer 41 from the scanner 20 can be conveniently checked by a user through the output device 30 positioned near the scanner 20.

Figure 3:
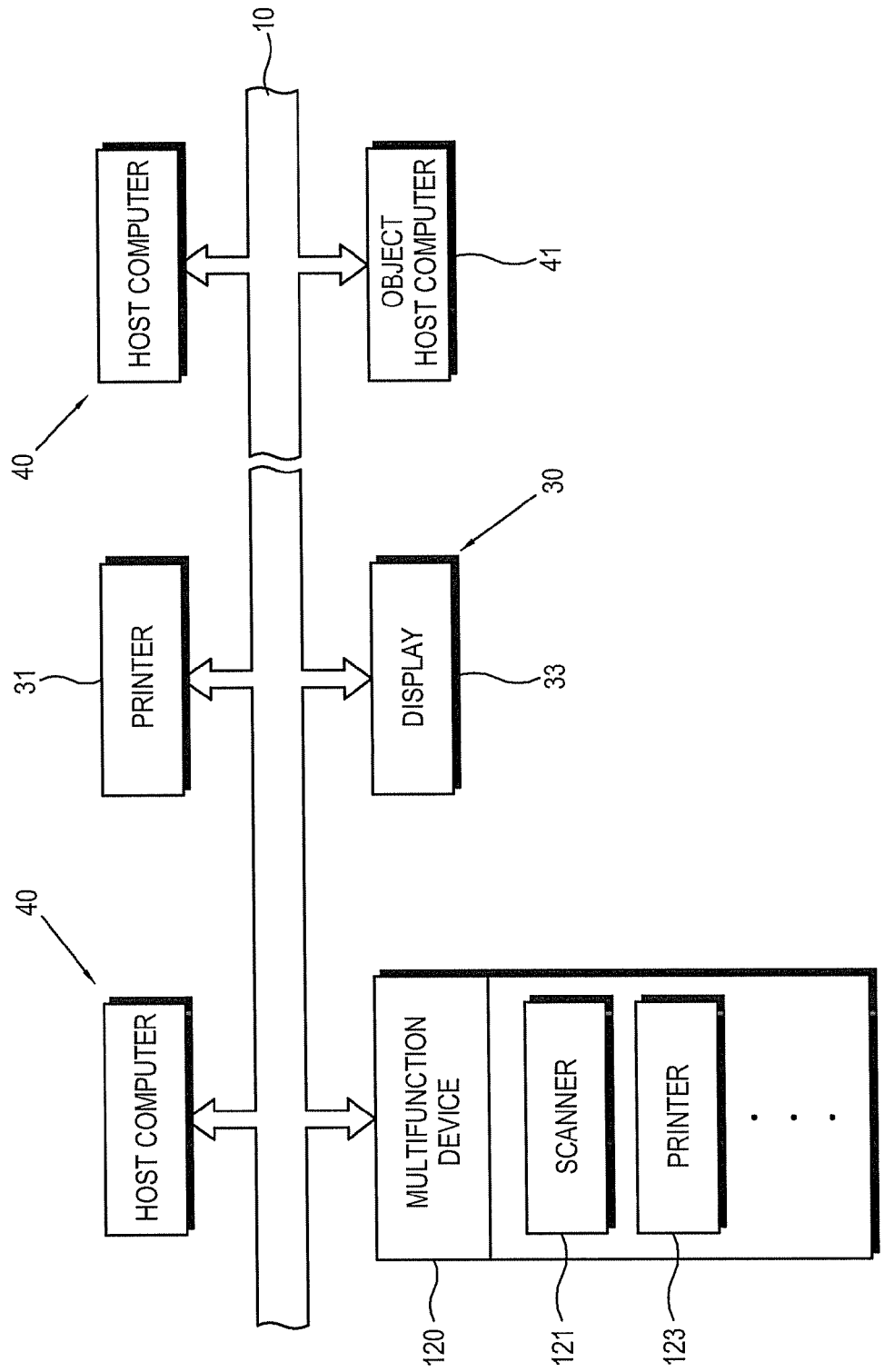
FIG. 3 is a schematic block diagram of a network scan apparatus according to another exemplary embodiment of the present invention.

Referring to FIG. 3, a network scan apparatus according to another exemplary embodiment of the present invention includes a multifunction device 120 connected through a network 10, and at least one host computer 40. Here, the multifunction device 120 is connected to the host computer 40 through a client program. Further, the network scan apparatus according to this embodiment may include an output device 30 such as a printer 31, a display 33, etc., which are connected to the network 10. In the following description of the network scan apparatus according to the embodiment shown in FIG. 3, like numerals refer to like elements shown in FIG. 1, and repetitive descriptions are avoided except when necessary.

The multifunction device 120 includes a scanner 121 and a printer 123 used as a kind of output device. Similar to the scanner 20 according to the embodiment described above in connection with FIG. 1, the scanner 121 shown in FIG. 3 includes a scanning unit (not shown), a transmitting unit (not shown), and an output selection unit (not shown). Here, the printer 123 is incorporated with the scanner 121 and constitutes the multifunction device 120. The printer 123 outputs scan file information transmitted from an object host computer 41.

Using the multifunction device 120 with the built-in scanner 121 and the built-in printer 123 as shown in FIG. 3, a user can check whether the scanning operation is successfully completed on the basis of the output scan file information related to a scanned document.

According to the network scan apparatus with the configuration shown in FIG. 3, the information related to the image data which is scanned by the scanner 121 and transmitted to the remote object host computer 41 from the scanner 121 can be checked by a user using the printer 123 incorporated with the scanner 121.

A network scan method according to an exemplary embodiment of the present invention will now be described with reference to FIGS. 1 and 4. The network scan method according to the exemplary embodiment shown in FIG. 4 scans a document using the network scan apparatus shown in FIG. 1. As described above, the network scan apparatus shown in FIG. 1 includes the scanner 20, the output device 30 which outputs information related to a scanned document, and at least one host computer 40 connected to the scanner 20 and the output device 30 through the network 10.

Figure 4:
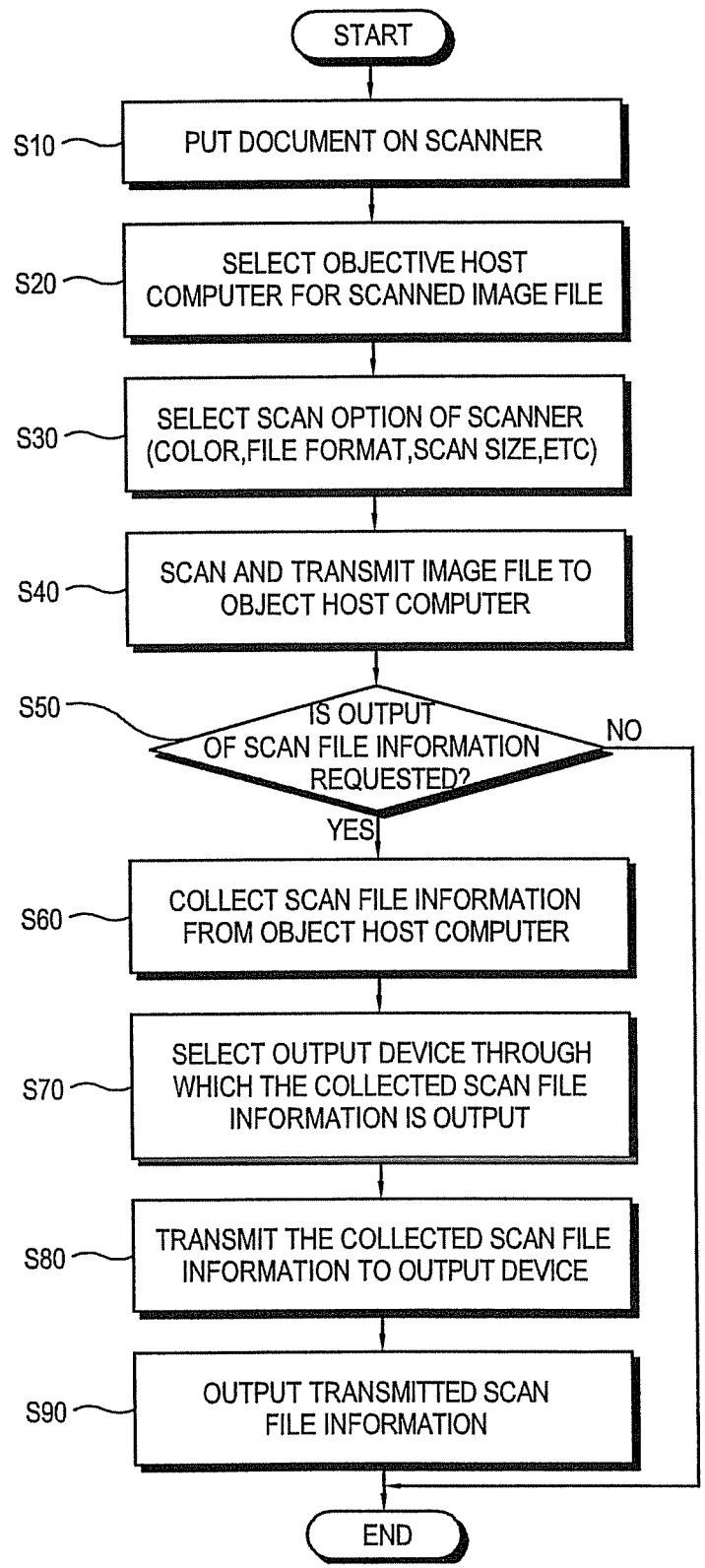
FIG. 4 is a flowchart of a network scan method according to an exemplary embodiment of the present invention.

Referring to FIG. 4, the network scan method according to aspects of the present invention includes the following first through third operations. In the first operation, a document is scanned and a scanned image file is transmitted to the object host computer 40. In more detail, the first operation includes a sub-operation S10 of positioning the document to be scanned on the scanner 20, a sub-operation S20 of selecting the object host computer 41 to receive the scanned file among the host computers 40 on the network 10, and a sub-operation S40 of scanning the document through the scanner 20 and transmitting the scanned image file to the selected object host computer 41.

Further, the first operation may include another sub-operation S30 of selecting a scan option of the scanner 20 through the option selection unit 27. The various types of scan options may include, for example, at least one of a color option (i.e., whether to scan the image file in color or black and white), a file format option, and a scan size option. However, it is understood that this additional sub-operation S30 may be omitted.

The second operation S50 includes requesting scan file information to be output. In operation S50, a user selects whether to output the scan file information through the output selection unit 25. If a user does not want to output the scan file information, the user chooses not to request the scan file information to be output at operation S50, and the scanning operation is finished at the time when the scanned image file is transmitted to the object host computer 41.

On the other hand, if a user wants to output the scan file information, the third operation is performed as requested. In the third operation, the output device 30 receives the scan file information from the object host computer 41 and outputs the received scan file information. Specifically, the third operation includes sub-operation S60 of collecting the scan file information from the object host computer 41.

According to an aspect of the present invention, the scan file information collected in sub-operation S60 may include at least one of a number of scanned document pages, a file name of the image file, a size of the image file, a location of the image file, a resolution of the image file, a linked program to execute the image file, the name of the object host computer, an internet protocol of a network used to transmit the image file from the scanner 20 to the object host computer 41, a thumbnail of the image file, a date and a time of a scanning operation, etc.

Further, the output device 30 includes at least one of the printer 31 which prints the scan file information on a printing medium, and the display 33 which displays the scan file information on a screen thereof. The display 33 may be various types of screens commonly employed in image forming apparatuses, such as an LCD screen, etc.

Here, if multiple output devices 30 are provided adjacent to the scanner 20 as shown in FIG. 1, there may additionally be a sub-operation (not shown) of selecting one of the output devices 30 to output the scan file information through a manipulating unit (not shown) of the scanner 20.

The third operation may further include sub-operation S70 of selecting an output device 30 to output the collected scan file information, S80 of transmitting the collected scan file information to the selected output device 30, and S90 of outputting the transmitted scan file information through the selected device 30.

Figure 5:
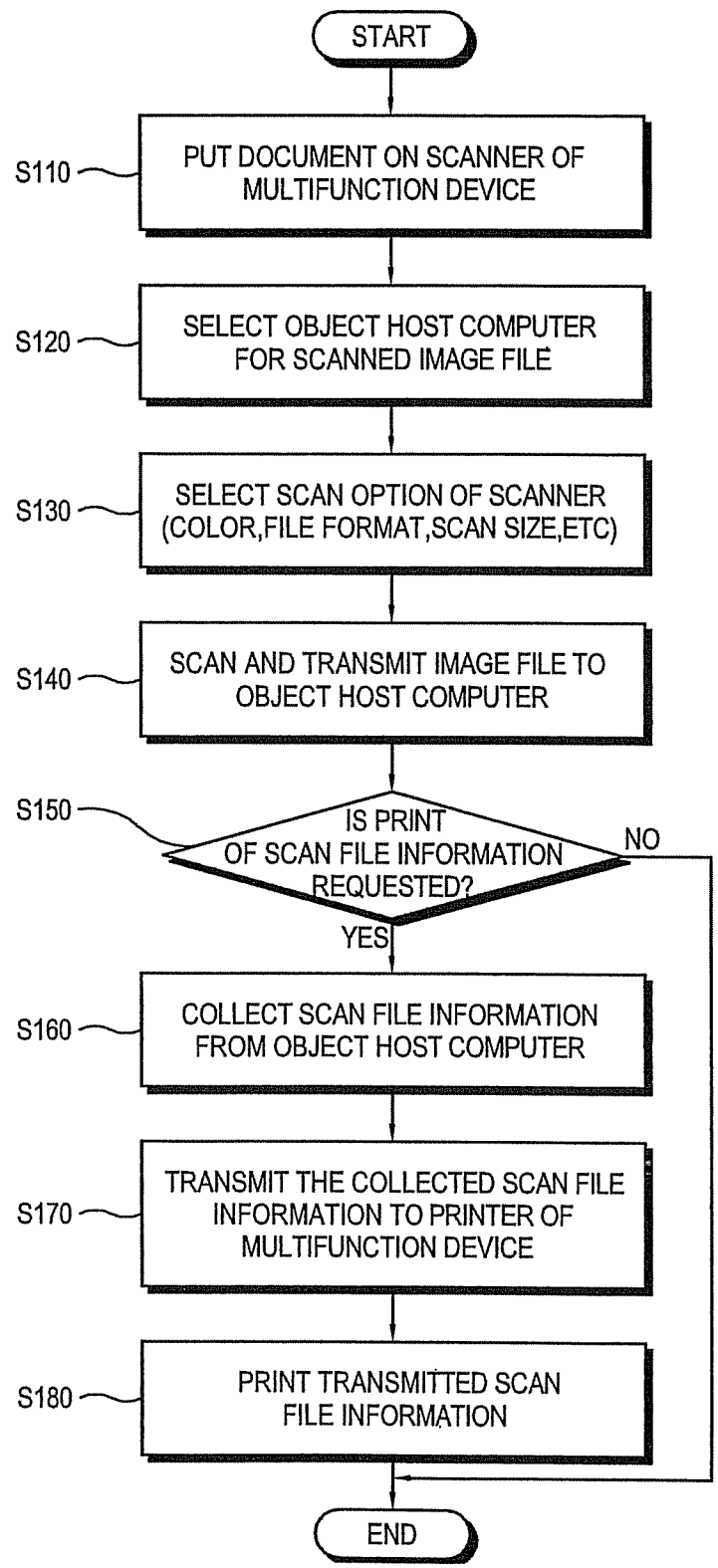
FIG. 5 is a flowchart of a network scan method according to another exemplary embodiment of the present invention.

Meanwhile, a network scan method according to another exemplary embodiment shown in FIG. 5 employs the network scan apparatus as shown in FIG. 3 to scan a document. Referring to FIG. 3, the network scan apparatus includes the multifunction device 120, and at least one host computer 40 connected to the multifunction device 120 through the network 10. The network scan apparatus shown in FIG. 3 may include the output device 30 shown in FIG. 1 having the printer 31, the display 33, etc., which are connected to the network 10, although is not limited thereto. Further, the multifunction device 120 includes the scanner 121 and the printer 123 to output the scan file information.

Referring to FIG. 5, the network scan method according to another embodiment of the present invention includes the following first through third operations. In the first operation, an object document is scanned and the scanned image file is transmitted to the object host computer 41. In more detail, the first operation includes sub-operation S10 of positioning the document to be scanned on the scanner 121 of the multifunction device 120, sub-operation S120 of selecting the object host computer 41 to transmit the scanned file among the host computers 40 on the network 10, and sub-operation S140 of scanning the document through the scanner 121 and transmitting the scanned image file to the object host computer 41. Further, the first operation may include an additional sub-operation S130 of selecting a scan option of the scanner 121. According to an aspect of the present invention, the scan option includes at least one of a color option (i.e., whether the image file is scanned in color or black and white), a file format, and a scan size. However, it is understood that sub-operation S130 may be omitted.

The second operation S150 is an operation of selecting whether to output the scan file information. The second operation S50 shown in FIG. 5 is substantially the same as the second operation S50 of the aforementioned exemplary embodiment shown in FIG. 4. Thus, detailed descriptions of the second operation S150 are omitted.

In the third operation, the printer 123 receives the scan file information from the object host computer 41 and prints the received scan file information. Specifically, the third operation includes sub-operation S160 of collecting the scan file information from the object host computer 41. Further, the third operation may further include a sub-operation S170 of transmitting the collected scan file information to the printer 123, and sub-operation S180 of printing the transmitted scan file information using the printer 123. According to an aspect of the present invention, the scan file information collected in operation S160 is substantially the same as the scan file information described above in connection with the aforementioned operation S60 shown in FIG. 4.

As described above, in the case of the network scan apparatus with the multifunction device 120 having the built-in scanner 121 and the built-in printer 123, it is possible to print the scan file information through the printer 123 by the first through third operations, so that the information related to the image data, which is scanned by the scanner 121 located in a remote location from the object host computer 41 and transmitted to the object host computer 41, may be conveniently checked by a user using the printer 123 incorporated in the multifunction device 120.

Consequently, the network scan apparatuses and the network scan methods according to aspects of the present invention enable a user to efficiently check the information related to the image data, which is scanned by the scanner 20 shown in FIG. 1 (or the multifunction device 120 shown in FIG. 3) located in a remote location from the object host computer 41, using an output device 30 neighboring the scanner 20 or using the printer 123 incorporated with the scanner 121.

Accordingly, aspects of the present invention decrease an amount of time taken by a user to check scanned results after a scanning operation is completed, as compared with the time taken in the conventional network scan apparatus in which a user has to go to the object host computer 41 to check the scanned results. In other words, aspects of the present invention eliminate the need of inconveniently moving between the object host computer 41 and the scanner 20 in order to check whether the scanning operation is successfully performed, thereby improving efficiency.

Although a few embodiments of the present invention have been shown and described, it would be appreciated by those skilled in the art that changes may be made in this embodiment without departing from the principles and spirit of the invention, the scope of which is defined in the appended claims and their equivalents.

What is claimed is:

1. A network scan method of scanning a document, the method comprising:
   performing a scanning operation by scanning a document with a scanner to generate a scanned image file based on the scanned document, and transmitting the scanned image file to an object host computer connected to the scanner through a network;
   requesting, by the scanner, scan file information comprising properties of the scanned image file stored on the object host computer to be output by one of a plurality of output devices connected to the scanner through the network, the scan file information enabling confirmation of results of the scanning operation;
   receiving a selection signal for one of the plurality of output devices to output the scan file information;
   transmitting the scan file information from the object host computer to the selected output device; and
   outputting the transmitted scan file information through the output device,
   wherein the plurality of output devices comprise at least one of a printer connected to the scanner and a display of the printer, to output the scan file information, and
   the scan file information comprises at least one of a number of scanned document pages, a size of the scanned image file, a location of the scanned image file, a resolution of the scanned image file, a linked program to execute the scanned image file, and a thumbnail of the scanned image file.

2. The network scan method according to claim 1, wherein the transmitting of the scanned image file comprises:
   selecting the object host computer to which the scanned image file is transmitted from among a plurality of host computers connected to the network; and
   transmitting the scanned image file to the selected object host computer.

3. The network scan method according to claim 1, wherein the outputting of the transmitted scan file information comprises:
   collecting the scan file information transmitted from the object host computer using the output device.

4. The network scan method according to claim 1, wherein the scanner and the printer constitute a multifunction device.

5. The network scan method according to claim 1, wherein the output device or the scanner further comprises a display to display the scan file information.

6. The network scan method according to claim 1, further comprising selecting a scan option of the scanner.

7. The network scan method according to claim 6, wherein the selecting of the scan option comprises selecting at least one of a color option, a file format option, and a scan size option.

8. The network scan method according to claim 1, wherein the outputting of the transmitted scan file information comprises outputting the transmitted scan file information to indicate whether the scanning of the document is successful.

9. The network scan method of claim 1, wherein the scan file information is requested, transmitted, and output according to a user selection.

10. The network scan method of claim 1, wherein the generated scanned image file comprises scan image data, and the object host computer creates the scan file information based on the scan image data of the transmitted scanned image file.

11. The network scan method of claim 1, wherein the scan file information enables confirmation of results of the scanning of the scanning operation.

12. The network scan method of claim 1, wherein the scan file information enables confirmation of results of the transmitting of the scanning operation.

13. A scanning apparatus, comprising:
   a scanner to connect to an object host computer via a network, to perform a scanning operation by scanning a document to generate a scanned image file based on the scanned document and transmitting the scanned image file to the object host computer, and to enable a user to selectively request scan file information comprising properties of the scanned image file stored on the object host computer, and confirm results of the scanning operation based on the requested scan file information; and
   a plurality of output devices connected to the scanner through the network to output the scan file information according to whether the scan file information is selected to be output to one of the plurality of output devices,
wherein the scan file information comprises at least one of a number of scanned document pages, a size of the scanned image file, a location of the scanned image file, a resolution of the scanned image file, a linked program to execute the scanned image file, and a thumbnail of the scanned image file.

14. The scanning apparatus of claim 13, wherein the output device is a display on a printer connected to the scanner via the network to display the scan file information.

15. The scanning apparatus of claim 13, wherein the output device is a printer connected to the scanner via the network to print the scan file information on a printing medium.

16. The scanning apparatus of claim 13, wherein the output device is a printer included within the scanner to print the scan file information on a printing medium.

17. The scanning apparatus of claim 13, wherein the scanner transmits the scanned image file to the object host computer via the network, the object host computer transmits the scan file information to the output device via the network, and the scanner is located closer to the output device than the object host computer.

18. The scanning apparatus of claim 13, wherein the output device is included within the scanner or is provided as a peripheral device to the scanner.

19. A method of scanning a document with a scanner connected to a network, comprising:
performing a scanning operation by scanning a document to generate a scanned image file based on the scanned document, and transmitting the scanned image file to an object host computer via the network;
requesting, by the scanner, scan file information comprising properties of the scanned image file stored on the object host computer, the scan file information enabling confirmation of results of the scanning operation;
receiving a selection signal for one of a plurality of output devices to output the scan file information; and
outputting the scan file information transmitted from the object host computer through the selected output device,
wherein the scan file information comprises at least one of a number of scanned document pages, a size of the scanned image file, a location of the scanned image file, a resolution of the scanned image file, a linked program to execute the scanned image file, and a thumbnail of the scanned image file.

20. The method of claim 19, wherein the outputting of the scan file information comprises visually displaying the scan file information from a display located on a printer connected to the scanner via the network.

21. The method of claim 19, wherein the outputting of the scan file information comprises printing the scan file information on a printing medium using a printer connected to the scanner via the network.

22. The method of claim 19, wherein the outputting of the scan file information comprises printing the scan file information on a printing medium using a printer included in the scanner.

23. The method of claim 19, further comprising:
prompting a user of the scanner to select one of a plurality of output devices connected to the network; and
transmitting the scan file information from the object host computer to an output device via the network in response to the user selection, wherein the scanner is located closer to the selected output device than the object host computer.

* * * * *